United States Patent
Bartosik

(10) Patent No.: US 10,319,177 B2
(45) Date of Patent: *Jun. 11, 2019

(54) USER INTERFACE WITH SLIDER AND POPUP WINDOW FEATURE

(71) Applicant: Novomatic AG, Gumpoldskirchen (AT)

(72) Inventor: Oliver Bartosik, Guntramsdorf (AT)

(73) Assignee: Novomatic AG, Gumpoldskirchen (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,389

(22) Filed: Nov. 29, 2017

(65) Prior Publication Data

US 2018/0082522 A1     Mar. 22, 2018

Related U.S. Application Data

(63) Continuation of application No. 14/765,159, filed on Jul. 31, 2015, now Pat. No. 9,842,458.

(51) Int. Cl.
*G07F 17/32* (2006.01)
*G07F 17/34* (2006.01)
*G06F 3/0485* (2013.01)

(52) U.S. Cl.
CPC ...... *G07F 17/3213* (2013.01); *G06F 3/04855* (2013.01); *G07F 17/3209* (2013.01); *G07F 17/3211* (2013.01); *G07F 17/3288* (2013.01); *G07F 17/34* (2013.01)

(58) Field of Classification Search
None
See application file for complete search history.

(56) References Cited

U.S. PATENT DOCUMENTS

| 6,980,064 | B1 | 12/2005 | Boulerne |
| 8,613,664 | B2 * | 12/2013 | Anderson ............... G07F 17/32 273/138.1 |
| 9,530,281 | B2 | 12/2016 | Basallo |
| 2006/0279044 | A1 | 12/2006 | Pacey |
| 2007/0270208 | A1 | 11/2007 | Caspers et al. |

(Continued)

FOREIGN PATENT DOCUMENTS

| EP | 1895484 | 3/2008 |
| WO | WO03084624 | 10/2003 |

(Continued)

OTHER PUBLICATIONS

Office Action issued for U.S. Appl. No. 14/765,159 dated Mar. 6, 2017; 8 pps.

(Continued)

*Primary Examiner* — Ronald Laneau
(74) *Attorney, Agent, or Firm* — Fincham Downs LLC; Magdalena M. Fincham, Esq.

(57) ABSTRACT

A wagering interface is disclosed for a gaming apparatus, for applying a wager when playing a game. The wagering interface comprises a display screen for displaying at least a portion of the game being played and a slider which is repositionable along a slider path orientated to extend from a lower portion of the display to an upper portion of the display. The wager applied when playing the game is dependent on the position of the slider along the path which thus provides a gamer with a visual indication of the wager applied, and thus enables the gamer to better coordinate the application of the wager.

30 Claims, 7 Drawing Sheets

(56) References Cited

U.S. PATENT DOCUMENTS

| | | |
|---|---|---|
| 2008/0058068 A1 | 3/2008 | Bennett et al. |
| 2008/0064499 A1 | 3/2008 | Grant et al. |
| 2008/0234045 A1 | 9/2008 | Mezen |
| 2009/0239631 A1 | 9/2009 | Aoki et al. |
| 2010/0056256 A1* | 3/2010 | Surmacz .............. G07F 17/32 463/20 |
| 2010/0160016 A1 | 6/2010 | Shimabukuro et al. |
| 2011/0117999 A1* | 5/2011 | Anderson ............ G07F 17/32 463/20 |
| 2012/0196664 A1 | 8/2012 | Grant et al. |
| 2014/0087841 A1 | 3/2014 | Council |

FOREIGN PATENT DOCUMENTS

| | | |
|---|---|---|
| WO | WO2007085964 | 8/2007 |
| WO | WO2008142427 | 11/2008 |
| WO | WO2010088894 | 8/2010 |
| WO | WO2010102330 | 9/2010 |

OTHER PUBLICATIONS

Notice of Allowance for U.S. Appl. No. 14/765,159 dated Aug. 16, 2017; 5 pps.

* cited by examiner

USER INTERFACE WITH SLIDER AND POPUP WINDOW FEATURE

CLAIM OF PRIORITY

The Present Application is a Continuation Application of U.S. application Ser. No. 14/765,159, filed on Jul. 31, 2015 in the name of Oliver Bartosik and titled A WAGERING INTERFACE. The entirety of this application is incorporated by reference herein for all purposes.

The present invention relates to a wagering interface.

Gaming machines involving the application of a wager for the benefit of a possible pay out are well known and are generally referred to as slot machines. Slot machines typically comprise a display screen mounted within a housing for displaying the game, and a plurality of buttons mounted on a button panel separate to the display. The buttons are typically assigned a specific function such as for starting the game, collecting a win and placing a wager. However, as games have become more complicated, there has been an increase in the number of required buttons and this has led to the button panel becoming cluttered.

In an attempt to overcome this problem, gaming machines comprising smaller buttons have been developed, in addition to machines comprising buttons mounted on the display screen. However, in both situations, this often results in the gamer pressing an incorrect button owing to the proximal nature of the buttons to each other, which can result in an unintentional loss of the game. This is particularly problematic when applying a wager since a gamer can otherwise lose a significant credit.

In accordance with the present invention as seen from a first aspect, there is provided a wagering interface for applying a wager when playing a game, the wagering interface comprising a display screen for displaying at least a portion of the game being played, and a slider which is repositionable along a slider path which is orientated to extend from a lower portion of the display to an upper portion of the display, wherein the slider path comprises a plurality of graduated markings distributed therealong, the slider being attracted to a location of a marking disposed proximate thereto, such that the slider is required to overcome a threshold attraction to the location of the proximate marking in order to move along the path to a location of an adjacent marking, and wherein the wager applied when playing the game is dependent on the position of the slider along the path.

Advantageously, the disposition of the slider and slider path on the display releases further space on a button panel for further button operated functionality, whereas the alignment of the slider path from the lower region to the upper region of the display offers a more intuitive selection and indication of the wager applied. Moreover, the disposition of the slider and slider path on the display provides for a readily viewable indication of the wager while playing the game, without otherwise requiring a gamer to divert their viewing direction away from the display, such as to the button panel.

In an embodiment, the display screen comprises a touch sensitive screen and the slider and slider path comprise a visual representation of a slider and slider path on the screen. In this case, the slider may be repositioned along the slider path by a gamer placing their finger on the representation of the slider on the screen and then moving their finger along the representation of the slider path on the screen. Upon removing their finger from the screen, the slider is then arranged to remain at the position along the slider path.

Alternatively however, the slider and slider path may comprise a physical slider mounted for sliding along a physical slider path, such as a rail.

Preferably, the wagering interface further comprises a controller for controlling the display of the slider and slider path on the display screen. The controller may comprise a processor for processing the position of the slider along the slider path to determine the wager applied and may be further arranged to execute the display of the game on the display screen.

In an embodiment, the displayed game may offer a plurality of selectable win combinations per play and the wager applied may be dependent on the number of win combinations selected. Accordingly, the wagering interface may comprise a first slider which is repositionable along a first slider path, orientated to extend from a lower portion of the display to an upper portion of the display, to vary the wager applied per win combination selected, for example, and a second slider which is repositionable along a second slider path, orientated to extend from a lower portion of the display to an upper portion of the display, to vary the number of selectable win combinations, for example.

The first slider and first slider path, and the second slider and second slider path are beneficially disposed at opposite sides of the display. This separation of sliders and corresponding slider paths minimises any untoward manipulation of a particular slider when operating the other slider, for example.

Preferably, the first and second slider paths comprise substantially linear paths and opposite ends of each slider path are preferably arranged to indicate a minimum and maximum value, respectively, such as a minimum and maximum wager per win combination and a minimum and maximum number of selectable win combinations. In this respect, the position of the slider along each respective path provides the gamer with a visual indication of the wager applied and thus enables the gamer to better coordinate the application of the wager.

In accordance with the present invention as seen from a second aspect, there is provided gaming apparatus, the apparatus comprising a housing and a wagering interface according to the first aspect supported within the housing.

In accordance with the present invention as seen from a third aspect, there is provided a computer implemented method of applying a wager when playing a game viewed on a display screen, the method comprising repositioning a slider along a slider path comprising a plurality of graduated markings distributed therealong and which extends from a lower portion of the display screen to an upper portion of a display screen, the method further comprising overcoming a threshold attraction between the slider and a location of a graduated marking located proximate thereto in order to move the slider to a location of an adjacent marking, wherein the wager applied when playing the game is dependent on the position of the slider along the path.

Embodiments of the present invention will now be described by way of example only and with reference to the accompanying drawings, in which.

Figure 3:
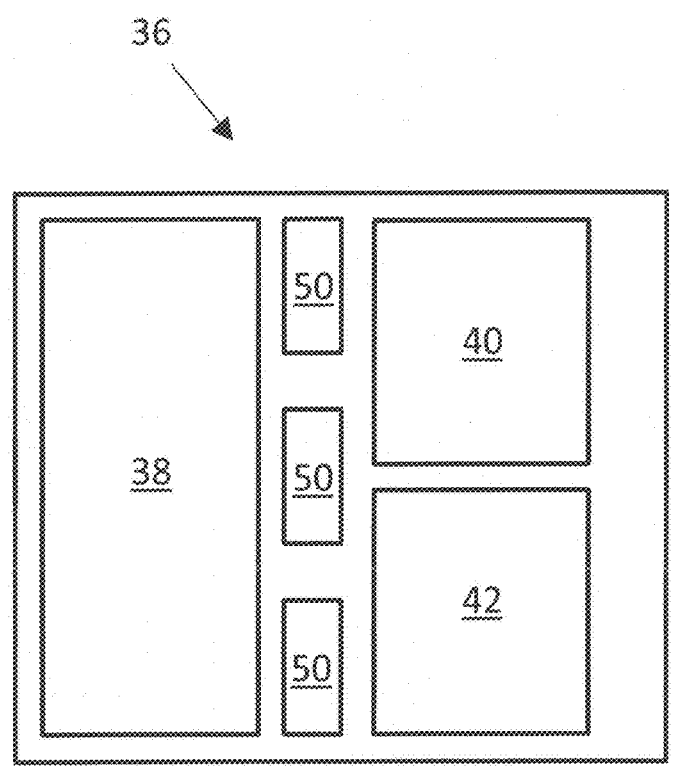
Figure 4:
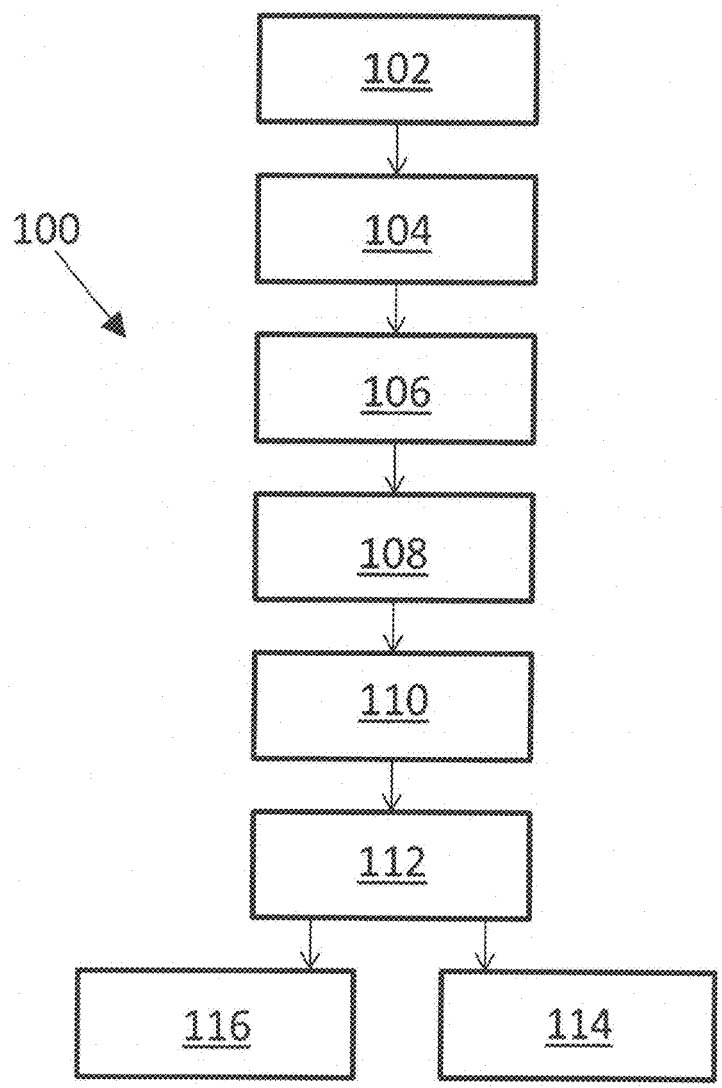
Figure 5:
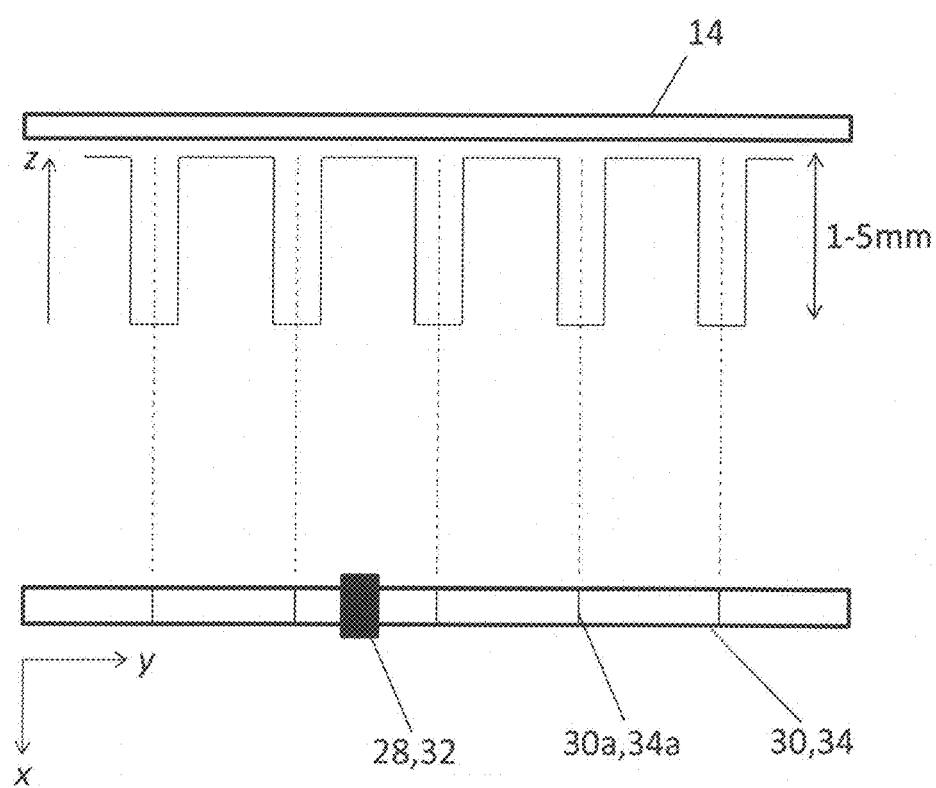

FIG. 3 is a schematic illustration of a computer comprising a controller which is mountable within the housing of the gaming apparatus; and, FIG. 4 is a schematic illustration of the steps associated with a computer implemented method according to an embodiment of the present invention; and, FIG. 5 is a schematic profile of the relative position of the display area relative to a gamer, as the gamer moves a slider along a slider path.

Figure 1:
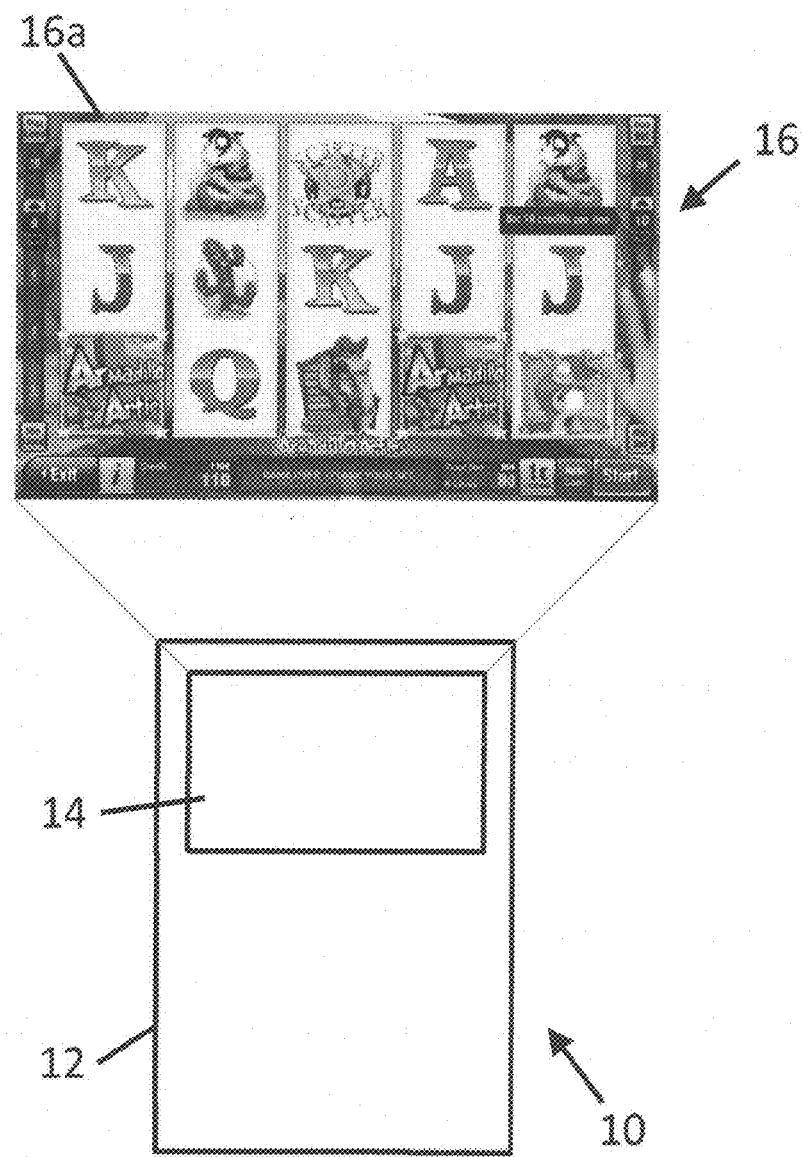
FIG. 1 is a front view of a gaming apparatus according to an embodiment of the present invention.

Referring to FIG. 1 of the drawings, there is illustrated a gaming apparatus 10 according to an embodiment of the present invention for playing a game involving the application of a wager. The gaming apparatus 10 includes a housing 12 having a display area 14 and a button panel (not shown) for enabling a gamer to control functions associated with the game, such as "start" for commencing the game and "collect" for collecting a pay out. In an embodiment, the gaming apparatus 10 comprises a slot machine, which is understood to comprise any gaming apparatus that is capable of enabling a player to play for entertainment with a possibility of a payout.

The display area 14 is arranged to accommodate a wagering interface 16 having a display screen 16a, which is supported by the housing 12 and which is arranged to display at least a portion of a game to be played. The interface 16 is mounted to face a gamer, who may be standing or sitting in proximity to the apparatus 10. In one embodiment of the invention, the interface 16 includes a digital display that is angled with respect to the floor to face a gamer. In another embodiment of the invention, the interface 16 includes a mechanical display that is likewise angled to face a gamer. It can be appreciated that hybrid arrangements having both digital and mechanical components are contemplated herein and the angle of the interface is adapted to face a gamer depending on, among other things, the height of the apparatus 10.

In an embodiment of the invention, the interface 16 comprises a set of five primary reels 18 sharing a common axis 20. In one embodiment of the invention, the reels 18 are physical objects, for example rotatable discs having a display surface 22 disposed on a periphery thereof, for displaying symbols 24. In another embodiment, as illustrated in FIG. 2 of the drawings, the reels 18 comprise electronic images, being electronically represented as virtual rotatable discs having a peripheral edge with a display surface 22.

The display surface 22 of each reel 18 comprises a plurality of symbols 24 which may comprise playing card values, such as King, Jack, Queen, Joker and various numerical card values. The symbols 24 may also include any other symbols that create interest to a player. The symbols 24 can include digital images, or video-streamed images, or a combination thereof.

The reels 18 are separately arranged to independently rotate about the axis 20, which is common to the reels 18. Referring to FIG. 2 of the drawings, the displayed symbols 24 are aligned to a grid of five columns and three rows. The location of the symbols 24 on the reels 18 collectively define a plurality of separate win combinations or paylines 26. The win determination of a payline 26 is based on a horizontal, diagonal, or both horizontal and diagonal alignment of symbols, such as those illustrated in FIG. 2 of the drawings.

The paylines 26 are displayed on the screen 16a and a gamer may select the number of paylines 26 which are to be used when determining a win, in accordance with the position of a slider 28 which is repositionable along a slider path 30. The slider path 30 comprises a substantially linear path which is disposed at one side of the screen 16a, which in the illustrated embodiment comprises the left side of the screen 16a. The slider path 30 extends from a lower portion of the screen 16a to an upper portion of the screen 16a, in a direction which is substantially perpendicular to the rotational axis 20 of the reels 18. The lowermost and uppermost part of the path 30 respectively indicate a minimum and maximum number of possible selectable paylines 26, such that the position of the slider 28 along the path 30 is representative of the number of paylines 26 selected and provides for a visual indication of the number of paylines 26 selected.

Figure 2A:
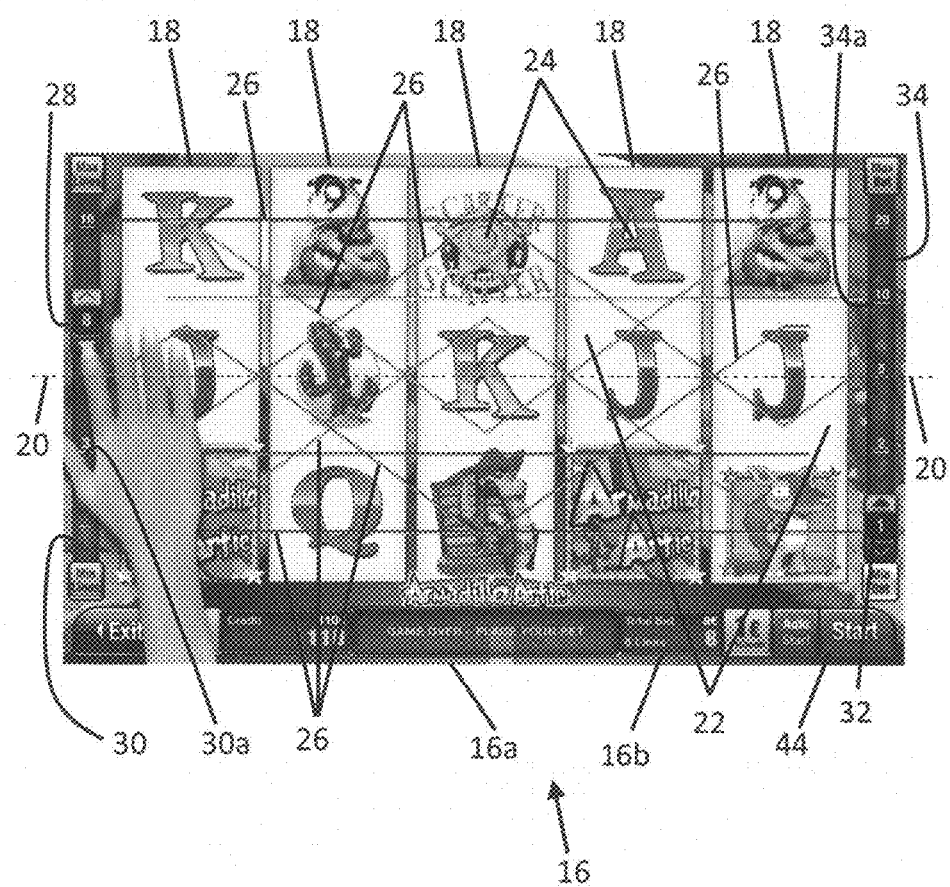
FIG. 2a is a view of a display screen comprising a wagering interface according to an embodiment of the present invention.

In the embodiment illustrated in FIG. 2a of the drawings, the gamer is further required to select a wager which is applied per selected payline 26, such that the total wager applied when playing the game is dependent on the number of selected paylines 26 and the wager applied per payline 26. The wager applied per selected payline 26 is dependent on the position of a further slider 32 which is similarly repositionable along a further slider path 34. The slider path 34 similarly comprises a substantially linear path which is disposed at the side of the screen 16a, which is opposite the side comprising the slider 28, which in the illustrated embodiment comprises the right side of the screen 16a. The slider path 34 extends from a lower portion of the screen 16a to an upper portion of the screen 16a, in a direction which is substantially perpendicular to the rotational axis 20 of the reels 18. The lowermost and uppermost part of the path 34 respectively indicate a minimum and maximum wager, such that the position of the slider 32 along the path 34 is representative of the wager applied per payline 26 and provides a visual indication of the wager applied.

The slider paths 30, 34 separately comprise a graduated scale having a plurality of graduated markings 30a, 34a. The markings 30a, 34a comprise integral values of the scale. For example, in the case of the slider path 30, the markings 30a comprise integral values of the number of paylines 26, namely 1, 2, 3 etc, whereas in the case of the slider path 34, the markings 34a comprise integral values for the wager applied per payline 26, such as £1, £2 etc.

Figure 2B:
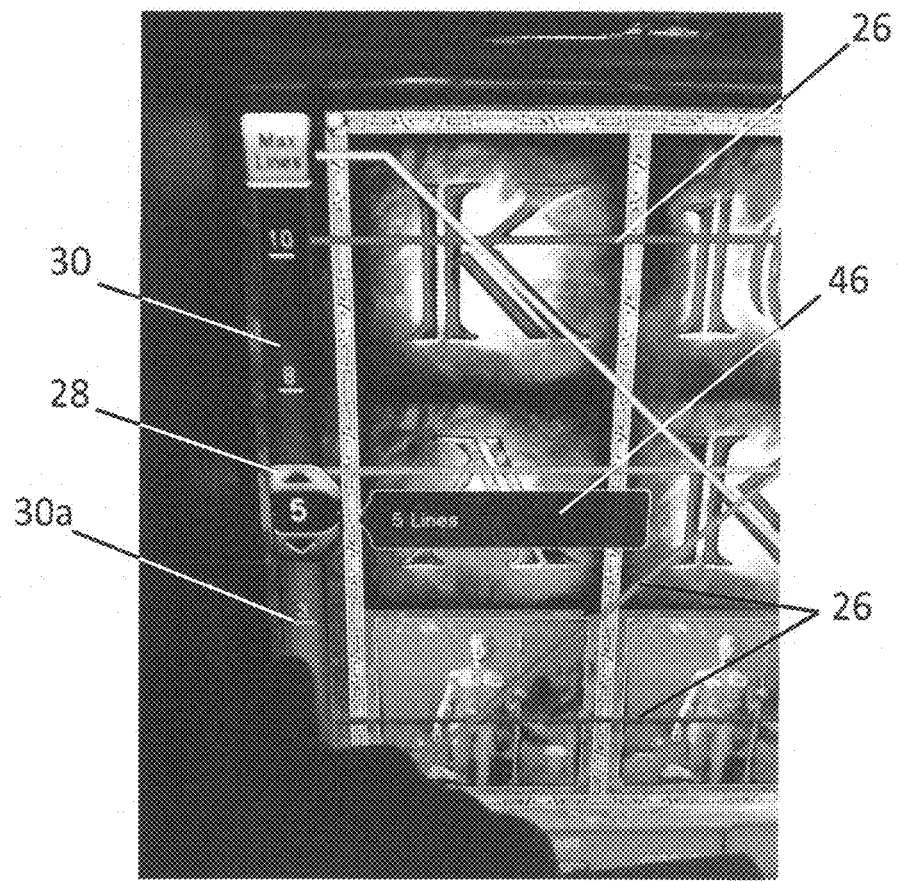
FIG. 2b is a view of a display screen comprising a wagering interface according to an alternative embodiment of the present invention.
Figure 2C:
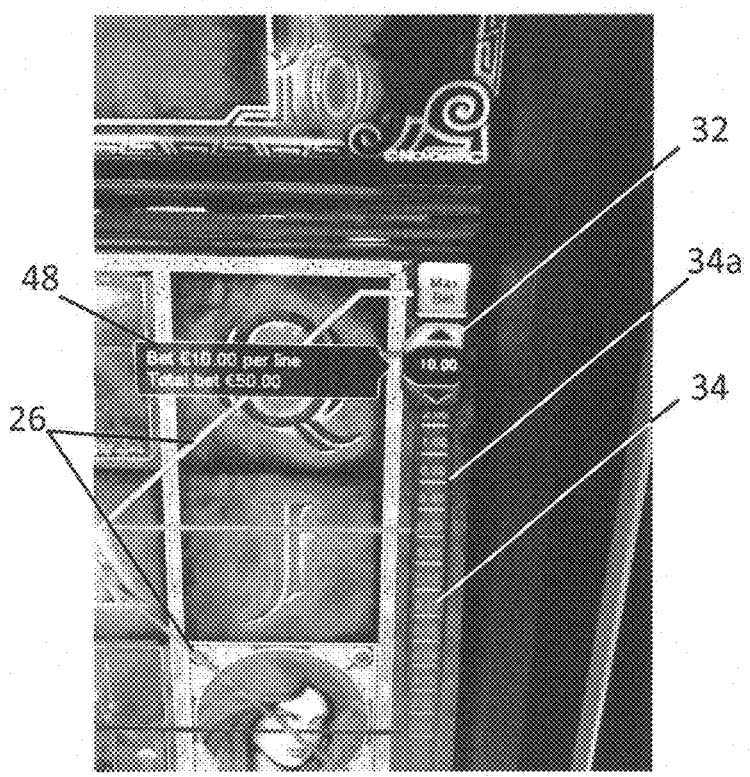
FIG. 2c is a view of a display screen comprising a wagering interface according to a further alternative embodiment of the present invention.

The slider paths 30, 34 are arranged to attract the respective slider 28, 32 to the location of the markings 30a, 34a such that the sliders 28, 32 "jump locate" to the nearest marking when moving along the respective path 30, 34. It is found that this further minimizes any misapplication of the wager or selection of the paylines 26, since the gamer is required to overcome a threshold attraction between the slider 28, 32 and the location of the proximate marking in order to move the slider 28, 32 along the respective slider path 30, 34 to an adjacent marking. In addition, the sliders 28, 32 are arranged to display the selected value to the gamer to provide further verification to the gamer of the selected value. Alternatively, or in addition thereto, a pop-up window 46, 48 may be displayed upon moving a slider 28, 32 along the respective path 30, 34, as illustrated in FIGS. 2b and 2c of the drawings. The pop-up window 46, 48 is arranged to display information relating to the position of the slider 28, 32 along the respective path. For example, upon moving slider 28 (as illustrated in FIG. 2b of the drawings) a pop-up window 46 is arranged to appear adjacent the slider 28, which displays the total number of pay lines selected corresponding to the position of the slider 28 along the path 30. Similarly, upon moving slider 32, a pop-up window 48 may appear adjacent the slider 32 which displays the wager applied per line and the total wager applied. The window 46, 48 displayed upon moving a slider 28, 32 is arranged to move with the position of the slider 28 32 along the respective path 30, 34 and is further arranged to fade or otherwise disappear once the slider 28, 32 has remained stationary along the respective path 30, 34, for a predetermined time.

The gaming apparatus 10 further comprises a computer 36 having a controller 38 as illustrated in FIG. 3 of the drawings, which is mountable within the housing 12 thereof, and which is arranged to control the operation of the game and thus the wagering interface 16. The controller 38 comprises a memory 40 for storing the software for one or more games to be played on the apparatus 10 and a processor 42 for executing the one or more games. The processor 42 is further arranged to determine the total wager applied per play of a particular game and the win amount derived from a particular win combination being achieved.

Referring to FIG. 4 of the drawings, there is illustrated a schematic illustration of a computer implemented method 100 of applying a wager when playing a game viewed on a display screen 16a, such as a game associated with the above described gaming apparatus 10. When using the gaming apparatus 10 and thus the wagering interface 16 as described above, the gamer is first required to apply one or more credits to the apparatus 10 via a credit slot at step 102, such as a coin slot disposed in the housing 12 of the apparatus 10. The credit is subsequently verified via a credit reader (not shown) at step 104, which authorizes the controller 38 to execute the game at step 106 in dependence of the applied credit exceeding a credit threshold, such as a minimum payment. The gamer then selects the required wager by sliding the sliders 28, 32 along the respective slider path 30, 34 at step 108, to select the number of possible paylines 26 and the wager per payline 26. It is to be appreciated however that the total wager applied cannot exceed the credit applied to play the game. In this respect, the sliders 28, 32 and slider paths 30, 34 provide the gamer with an intuitively verifiable means of determining the wager applied when playing the game.

In situations where the sliders 28, 32 and slider paths 30, 34 are represented virtually on the touch sensitive screen 16a, the gamer moves the slider 28, 32 along the respective path by placing their finger on the representation of the slider 28, 32 on the screen 16a and then moving their finger along the representation of the slider path 30, 34 on the screen 16a. The memory 40 comprises information relating to the position of the markings 30a, 34a along the paths 30, 34 and the controller 38 is arranged to monitor for the position of the gamers' finger along the slider path 30, 34 and determine the nearest marking to the gamers' finger by cross-referencing the position of the gamers finger with the known locations of the markings 30a, 34a. In an embodiment, as the gamer moves their finger along the path 30, 34, the slider will begin to move from its initial location but lag behind the location of the gamers finger as an indication to the gamer of the slider's 28, 32 attraction to its initial position/marking 30a, 34a. However, as the gamer's finger moves closer to an adjacent marking 30a, 34a the slider 28, 32 will jump locate to the adjacent marking 30a, 34a. In an alternative embodiment, the slider 28, 32 is arranged to follow the movement of the gamers' finger along the path 30 34 and when the gamer lifts their finger from the screen 16a, the slider 28, 32 is arranged to jump locate to the nearest marking 30a, 34a at a speed representative of the separation of the slider 28, 32 from the nearest marking 30a, 34a. In a further embodiment, the gamer can select the desired position of the slider 28, 32 along the respective path 30, 34 by touching the corresponding marking 30a, 34a along the path 30, 34. This causes the slider 28, 32 to jump along the respective path 30, 34 and locate at the selected marking 30a, 34a.

In a further embodiment, the apparatus is further arranged to provide a tactile feedback to the gamer when operating the movement of the slider 28, 32 on the display screen 16a. The position of the gamers' finger and thus the slider 28, 32 along the slider path 30, 34 is determined by the controller 38 or a further controller (not shown), such as a 3M MicroTouch™ EX II-9000 controller. The location of the gamers' finger is communicated from the controller 38 to the processor 42, which subsequently interrogates the memory 40 for one of a plurality of pre-stored tactile sensations. The apparatus 10 further comprises a plurality of actuators 50 (as illustrated in FIG. 3 of the drawings) for creating the desired tactile sensation, such as a vibration. The gaming software may comprise preferred sensations for particular locations of the gamers' finger along the slider path 30, 34. For example, the type of sensation and/or the intensity of the sensation may relate to the value of the selected wager. In this case, when the gamer moves their finger along the slider path 30 (for example), then as their finger approaches the marker representing two paylines, two vibrations may be generated. As the gamers' finger approaches the marker representing three paylines, then three vibrations may be generated, which may also be of a greater intensity than that generated at the marker representing two paylines. It is envisaged that this tactile feedback could provide additional confidence for the gamer when selecting the desired wager.

In yet a further embodiment, the controller 38 is arranged to varying the size and/or the magnification of the displayed game including the sliders 28, 32 and slider paths 30, 34 on the display screen 16a. As the gamer moves the slider 28, 32 along the slider path 30, 34, the controller 38 is arranged to vary the magnification and/or size of the displayed game in dependence of the position of the slider 28, 32 along the path 30, 34. For example, in situations where the gamer moves the slider upwardly of the respective path 30, 34 to increase the wager, then the controller 38 may be arranged to increase the magnification of the displayed game. Conversely, in situations where the gamer moves the slider 28, 32 downwardly of the respective path 30, 34, then the controller 38 may be arranged to reduce the magnification of the displayed game. This creates the impression upon the gamer that the displayed game moves toward and away from the gamers position and further emphasises the increase and decrease in applied wager, respectively. Once the desired wager has been applied, namely once the slider 28, 32 has remained stationary at a particular position along the respective path 30, 34 for a predetermined time, then the controller 38 is further arranged to restore the displayed game to a neutral or otherwise initial magnification state, ready for the application of subsequent wager.

However, it is also envisaged that the display area 14 comprising the display screen 16 may be arranged to physically move relative to the position of the gamer, in accordance with the position of the slider 28, 32 along the slider path 30, 34. Referring to FIG. 5 of the drawings, there is illustrated a schematic illustration of the display area 14 orientated within an x-y plane, and the relative movement of the display area 14 along a z-axis relative to the gamer, in accordance with the position of a slider 28, 32 along the respective path 30, 34. In particular, the display area 14 is arranged to move between a first and second position as the gamer moves the slider 28, 32 along the respective path 30, 34.

For example, the controller 38 may be arranged to monitor the position of the slider 28, 32 and actuate one or more motors (not shown) to cause the display area 14 to move away from the gamer through a distance of approximately 1-5 mm as the slider 28, 32 locates to a graduation marker 30a, 34a. The controller and motor are further arranged to return the display area 14 to its original position after the slider 28, 32 has remained stationary for a predetermined time or if the gamer continues to move the slider 28, 32 toward an adjacent marker 30a, 34a. The movement of the display area 14 is arranged to provide a further indication to the gamer of the location of the slider 28, 32 along the respective path 30, 34.

In situations where the sliders 28, 32 and slider paths 30, 34 are represented by a physical slider (not shown) mounted on a physical slider path, such as a rail (not shown), then the gamer can simply grip the slider (not shown) and move the slider along the rail (not shown) to the desired position. In this case, the slider 28, 32 may be attracted to the locations of the markings 30a, 34a along the rail (not shown) by a series of magnets (not shown). For example, the rail (not shown) may comprise a plurality of magnetic stations (not shown), separately disposed at a location along the rail corresponding to the location of the markings 30a, 34a, and the magnetic stations (not shown) are arranged to interact with a magnetic arrangement (not shown) disposed on the slider 28, 32. In this embodiment, the tactile feedback may be provided by one or more actuators (not shown) disposed within the slider 28, 32, which are arranged to provide tactile feedback. The feedback provided by the one or more actuators (not shown) may similarly vary in dependence of the location of the slider 28, 32 along the rail, which may be separately determined by one or more sensors (not shown) disposed along the rail, for example.

In either situation however, the sliders 28, 32 and slider paths 30, 34 provide the gamer with a clear representation of the wager applied for the game, and this representation remains in the gamer's field of view when playing the game, so that the gamer remains aware of the wager applied.

Once the desired wager has been set at step 108, this is then displayed on a portion 16b of the display screen 16a. The gamer subsequently commences the game, namely the rotation of the reels 18 by pressing the appropriate button on the button panel (not shown) of the apparatus 10 at step 110, or in the case of the embodiment illustrated in FIG. 2 of the drawings, the "start" button 44 represented on the display screen 16a. Once the reels 18 have stopped rotating, the processor 42 subsequently determines whether the alignment of symbols 24 along the selected paylines 26 correspond with a winning combination, at step 112. In the event that the alignment of symbols 24 along one or more selected paylines 26 corresponds with a winning combination, the processor 42 is arranged to credit the gamer with the winning amount at step 114. However, in the event that the alignment of symbols 24 along the selected paylines 26 do not correspond with a winning combination, then the processor 42 is arranged to retain the credit within a credit bin (not shown) disposed within the housing 12 of the apparatus 10, at step 116.

From the foregoing therefore, it is evident that the provision of the sliders 28, 32 and the orientation of the slider paths 30, 34 enable a gamer to readily apply a wager, and further facilitate the application of the intended wager by providing a clear visual representation of the wager to the gamer.

The invention claimed is:

1. A wagering interface for applying a wager when playing a game, the wagering interface comprising a display screen for displaying at least a portion of the game being played and a slider which is repositionable along a slider path which is orientated to extend from a lower portion of the display to an upper portion of the display,
    wherein the slider path comprises a plurality of graduated markings distributed therealong, the slider being attracted to a location of a marking disposed proximate thereto, such that the slider is required to overcome a threshold attraction to the location of the proximate marking in order to move along the path to a location of an adjacent marking,
    wherein the wager applied when playing the game is dependent on the position of the slider along the path, and
    wherein the wagering interface is operable to display a pop up window upon a movement of the slider along the slider path being detected.

2. The wagering interface of claim 1, wherein the pop up window is displayed adjacent to the slider.

3. The wagering interface of claim 1, wherein the pop up window displays information relating to a position of the slider along the slider path.

4. The wagering interface of claim 3, wherein the information relating to the position of the slider along the slider path comprises an indication of a number of paylines selected based on the position of the slider along the slider path.

5. The wagering interface of claim 3, wherein the information relating to the position of the slider along the slider path comprises an indication of a wager amount to be applied per payline and a total wager to be applied.

6. The wagering interface of claim 1, wherein the pop up window is arranged to move along with the slider along the slider path as the slider continues to be moved.

7. The wagering interface of claim 1, wherein the wagering interface is further operable to cease displaying the pop up window upon it being determined that the slider has remained stationary along the slider path for a predetermined time.

8. The wagering interface of claim 1, wherein the display screen comprises a touch sensitive screen and the slider and slider path comprise a visual representation of a slider and slider path on the screen.

9. The wagering interface of claim 1, wherein the slider and slider path comprise a physical slider mounted for sliding along a physical slider path.

10. The wagering interface of claim 1, further comprising a controller for controlling the display of the slider and slider path on the display screen.

11. The wagering interface of claim 10, wherein the controller comprises a processor for processing the position of the slider along the slider path to determine the wager applied.

12. The wagering interface of claim 11, wherein the processor is operable to detect the movement of the slider along the slider path and cause the wagering interface to display the pop up window responsive to detecting the movement.

13. The wagering interface of claim 11, wherein the controller is operable to vary a magnification and/or size of at least the portion of the displayed game based upon the position of the slider along the slider path.

14. The wagering interface of claim 10, wherein the controller is operable to vary a position of the display screen relative to a gamer based on the position of the slider along the slider path.

15. A computer implemented method of applying a wager when playing a game viewed on a display screen, the method comprising:
- repositioning a slider along a slider path comprising a plurality of graduated markings distributed therealong and which extends from a lower portion of the display screen to an upper portion of a display screen;
- overcoming a threshold attraction between the slider and a location of a graduated marking located proximate thereto in order to move the slider to a location of an adjacent marking, wherein the wager applied when playing the game is dependent on the position of the slider along the path; and
- displaying a pop up window responsive to the repositioning of the slider along the slider path.

16. The method of claim 15, wherein the pop up window is displayed adjacent to the slider.

17. The method of claim 15, wherein the pop up window displays information relating to a position of the slider along the slider path.

18. The method of claim 17, wherein the information relating to the position of the slider along the slider path comprises an indication of a number of paylines selected based on the position of the slider along the slider path.

19. The method of claim 17, wherein the information relating to the position of the slider along the slider path comprises an indication of a wager amount to be applied per payline and a total wager to be applied.

20. The method of claim 15, wherein the pop up window is moved along with the slider along the slider path as the slider is repositioned.

21. The method of claim 15, further comprising causing the pop up window to no longer be displayed upon it being determined that the slider has remained stationary along the slider path for a predetermined time.

22. The method of claim 15, further comprising varying a magnification and/or size of at least a portion of the displayed game based on the position of the slider along the slider path.

23. The method of claim 15, further comprising varying a position of the display screen relative to a gamer based on the position of the slider along the slider path.

24. A system for facilitating a game, the system comprising:
- a housing supporting a display;
- a controller; and
- a memory storing a program for instructing the controller to perform a method, the method comprising:
  - repositioning a slider along a slider path comprising a plurality of graduated markings distributed therealong and which extends from a lower portion of the display screen to an upper portion of a display screen;
  - overcoming a threshold attraction between the slider and a location of a graduated marking located proximate thereto in order to move the slider to a location of an adjacent marking, wherein the wager applied when playing the game is dependent on the position of the slider along the path; and
  - displaying in the display a pop up window responsive to the repositioning of the slider along the slider path.

25. The system of claim 24, wherein the pop up window is displayed adjacent to the slider.

26. The system of claim 24, wherein the pop up window displays information relating to a position of the slider along the slider path.

27. The system of claim 26, wherein the information relating to the position of the slider along the slider path comprises an indication of a number of paylines selected based on the position of the slider along the slider path.

28. The system of claim 26, wherein the information relating to the position of the slider along the slider path comprises an indication of a wager amount to be applied per payline and a total wager to be applied.

29. The system of claim 24, wherein the pop up window is arranged to move along with the slider along the slider path as the slider continues to be moved.

30. The system of claim 24, wherein the method further comprises removing the pop up window from the display upon it being determined that the slider has remained stationary along the slider path for a predetermined time.

* * * * *